US005884509A

United States Patent [19]

LeBoeuf

[11] Patent Number: 5,884,509

[45] Date of Patent: Mar. 23, 1999

[54] PROPELLER LOCK

[76] Inventor: Anthony LeBoeuf, 6200 Highway 56, Chauvin, La. 70344

[21] Appl. No.: 18,847

[22] Filed: Feb. 6, 1998

[51] Int. Cl.$^{6}$ .............................. B63H 5/16; F16B 41/00

[52] U.S. Cl. .................................... 70/18; 70/58; 70/164; 70/232; 416/146 R; 440/71

[58] Field of Search ................................... 70/14, 18, 58, 70/164, 232, 258, DIG. 57; 416/146 R, 146 B, 244 B, 245 A, 247 A; 440/71

[56] References Cited

U.S. PATENT DOCUMENTS

| | | | |
|---|---|---|---|
| 2,362,323 | 11/1944 | Stoppel | 416/247 A |
| 3,759,076 | 9/1973 | Reese | 70/232 |
| 3,981,165 | 9/1976 | Wersinger | 70/232 |
| 4,257,247 | 3/1981 | Sims | 70/232 |
| 4,957,459 | 9/1990 | Snyder | 440/71 X |
| 5,009,620 | 4/1991 | Feranda, Sr. | 416/247 A X |
| 5,176,550 | 1/1993 | Hooper | 416/247 A X |
| 5,246,345 | 9/1993 | Adams, Jr. | 70/232 X |
| 5,417,093 | 5/1995 | Heiberg | 70/232 |
| 5,469,721 | 11/1995 | Pyle | 70/14 |
| 5,527,193 | 6/1996 | Doelcher | 440/49 |
| 5,613,386 | 3/1997 | Mire, Sr. | 70/18 X |
| 5,778,706 | 7/1998 | Testa | 70/232 X |

*Primary Examiner*—Lloyd A. Gall
*Attorney, Agent, or Firm*—James Creighton Wray; Meera P. Narasimhan

[57] ABSTRACT

An apparatus for locking a propeller is provided for reducing the risk of theft of a propeller from a motor. The apparatus comprises a cover plate to cover an end of the propeller shaft. A U-shaped bar encircling one blade on the propeller and connected to the cover plate secures a portion of the cover plate against the end of the shaft. A locking arm connected to the cover plate, encircling another blade on the propeller, and connected to the middle portion of the U-shaped rod secures the remainder of the cover plate against the end of the shaft.

19 Claims, 2 Drawing Sheets

PROPELLER LOCK

BACKGROUND OF THE INVENTION

The present invention relates to an apparatus for locking a propeller on a marine motor and preventing theft thereof. The need exists for a device to protect the propeller on an outboard or inboard marine motor from theft. Propellers are generally secured to the motor by an exposed tab washer or cotter pin and propeller nut. The exposed nature of the nut provides for quick and easy removal of a propeller. A device which covers the exposed nut would be useful in preventing the theft of propellers.

SUMMARY OF THE INVENTION

An object of the present invention is to protect against theft of a propeller by covering the exposed propeller nut.

The apparatus consists of a cover plate, a U-shaped rod and a locking arm. The cover plate goes over the end of a propeller and prevents access to the propeller nut. The U-shaped rod and the locking arm encircle blades on the propeller and secure the cover plate in place.

A preferred embodiment of the propeller locking apparatus comprises a cover plate for positioning over an end of a propeller. A U-shaped rod encircles a first propeller blade, with the U-shaped rod having two ends connected to the cover plate and a middle portion distant from the cover plate. A locking arm is provided for encircling a second propeller blade, with the locking arm having a first end configured for connecting to the cover plate and a second end configured for connecting to the middle portion of the U-shaped rod.

Another preferred embodiment of the propeller locking apparatus comprises a cover plate for positioning over an end of a propeller, with the cover plate having a locking arm receiving hole. A hollow locking arm receiving cylinder is oriented concentrically with the locking arm receiving hole and attached to the cover plate. A U-shaped rod encircles a first propeller blade, with the U-shaped rod having two ends connected to the cover plate and a middle portion distant from the cover plate. A locking arm is provided for encircling a second propeller blade, with the locking arm having a first end configured for inserting into the hollow locking arm receiving cylinder and the hollow locking arm receiving hole, and a second end having an eyelet for connecting to the middle portion of the U-shaped rod. A lock connects the eyelet to the middle portion of the U-shaped rod.

The cover plate can be of any shape including but not limited to circular, rectangular and triangular. A circular cover plate is preferred. A circular cover plate provides total coverage for the open end of the propeller while reducing the amount of excess material outside of the circumference of the propeller shaft.

The spatial relationship of the locking arm receiving hole and the points of connection of the two ends of the U-shaped rod is critical for proper protection. In a preferred embodiment the locking arm receiving hole is nearly opposite across the face of the cover plate from the points of connection of the two ends of the U-shaped rod.

A strong connection between the cover plate and the two ends of the U-shaped rod is necessary to adequately lock the propeller. If the bond is too weak then the cover plate can be pried apart from the U-shaped rod. Any known connection between the cover plate and the U-shaped rod is employed. Welding is one preferred method of making a bond strong enough to connect the cover plate to the U-shaped rod.

The middle portion of the U-shaped rod can be in any form so long as the two ends are parallel and point in the same direction. A preferred embodiment has the middle portion of the U-shaped rod curved in an arc. However, the middle portion can be in other shapes such as a point or a square.

A preferred method for locking a propeller using the propeller locking apparatus comprises connecting two ends of a U-shaped rod to a cover plate, with the U-shaped rod having a middle portion. Next, placing the middle portion of the U-shaped rod around a first blade of the propeller. Then positioning the cover plate over an end of the propeller. Connecting a first end of a locking arm to the cover plate, and placing the locking arm around a second blade of the propeller. Then placing a second end of the locking arm in close proximity to the middle portion of the U-shaped rod. Finally, connecting the second end of the locking arm to the middle portion of the U-shaped rod.

A preferred method for connecting the first end of the locking arm to the cover plate comprises inserting the first end of the locking arm into a hollow locking arm receiving cylinder and a locking arm receiving hole on the cover plate.

A preferred method for connecting the second end of the locking arm to the middle portion of the U-shaped rod comprises connecting an eyelet on the second end of the locking arm to the middle portion of the U-shaped rod.

A preferred method for connecting the eyelet to the middle portion of the U-shaped rod comprises using a locking mechanism including a key lock or a combination lock.

These and further and other objects and features of the invention are apparent in the disclosure, which includes the above and ongoing written specification, with the claims and the drawings.

DETAILED DESCRIPTION OF THE DRAWINGS

Figure 1:
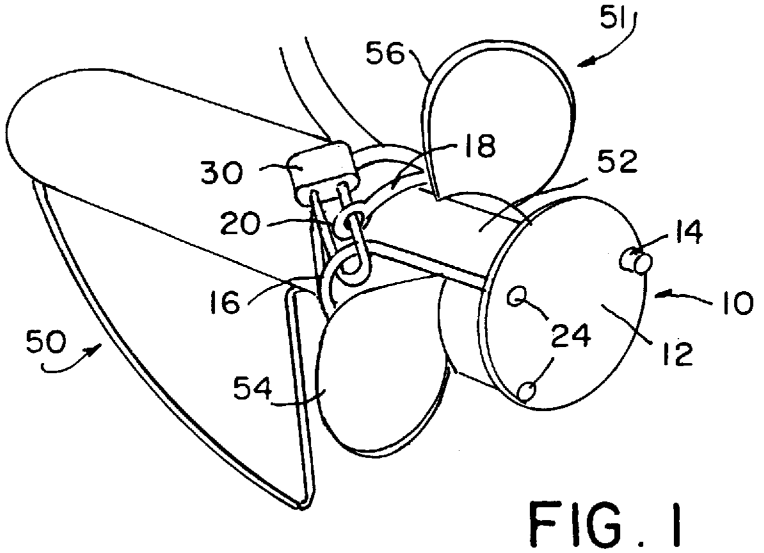
FIG. 1 is a perspective view of the lower end of an outboard marine motor with the propeller lock attached.
Figure 2:
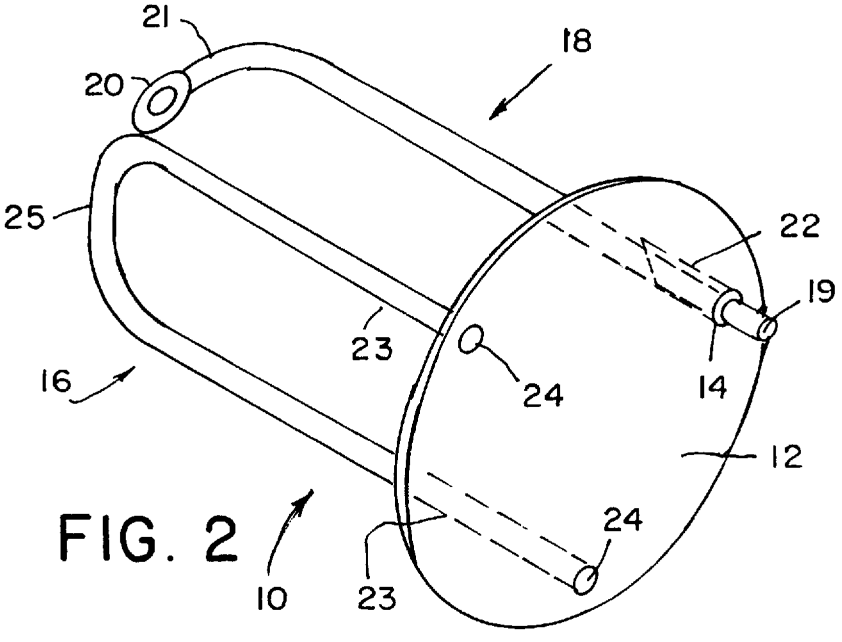
FIG. 2 is a perspective view of the propeller lock.

FIG. 1 shows a lower end of an outboard marine motor 50 with the attached propeller lock 10. FIG. 2 shows a perspective view of the propeller lock 10.

The cover plate 12 covers an end of the propeller shaft 52. The U-shaped rod 16 is attached to the cover plate 12 and encircles at least one propeller blade 54. The locking arm 18 encircles a second propeller blade 56. The first end 19 of the locking arm 18 is inserted into the locking arm receiving cylinder 22 and the locking arm receiving hole 14 on the cover plate 12. The second end 21 of the locking arm 18 has an eyelet 20 which is positioned in close proximity to the U-shaped rod 16. A lock 30 placed through the eyelet 20 and encircling the U-shaped rod 16 secures the propeller lock 10 to the propeller 51.

FIG. 2 shows the arrangement of the locking arm 18, the locking arm receiving cylinder 22, and the locking arm receiving hole 14. The locking arm receiving cylinder 22 is oriented along the same axis as the locking arm 18 and is placed concentrically over the locking arm receiving hole 14. The locking arm receiving cylinder 22 is preferably attached to the cover plate 12 on the side facing the marine motor 50. The locking arm receiving cylinder 22 is long enough to prevent removal of the locking arm 18 from the locking arm receiving cylinder 22 while the propeller lock 10 is secured.

The U-shaped rod 16 is attached to the cover plate 12 at two attachment points 24 corresponding to the ends of the U-shaped rod 16. For the propeller lock 10 to function optimally, the circle defined by the locking arm receiving hole 14 and the two attachment points 24 preferably has a diameter slightly larger than the diameter of the end of the propeller shaft 52.

Figure 3:
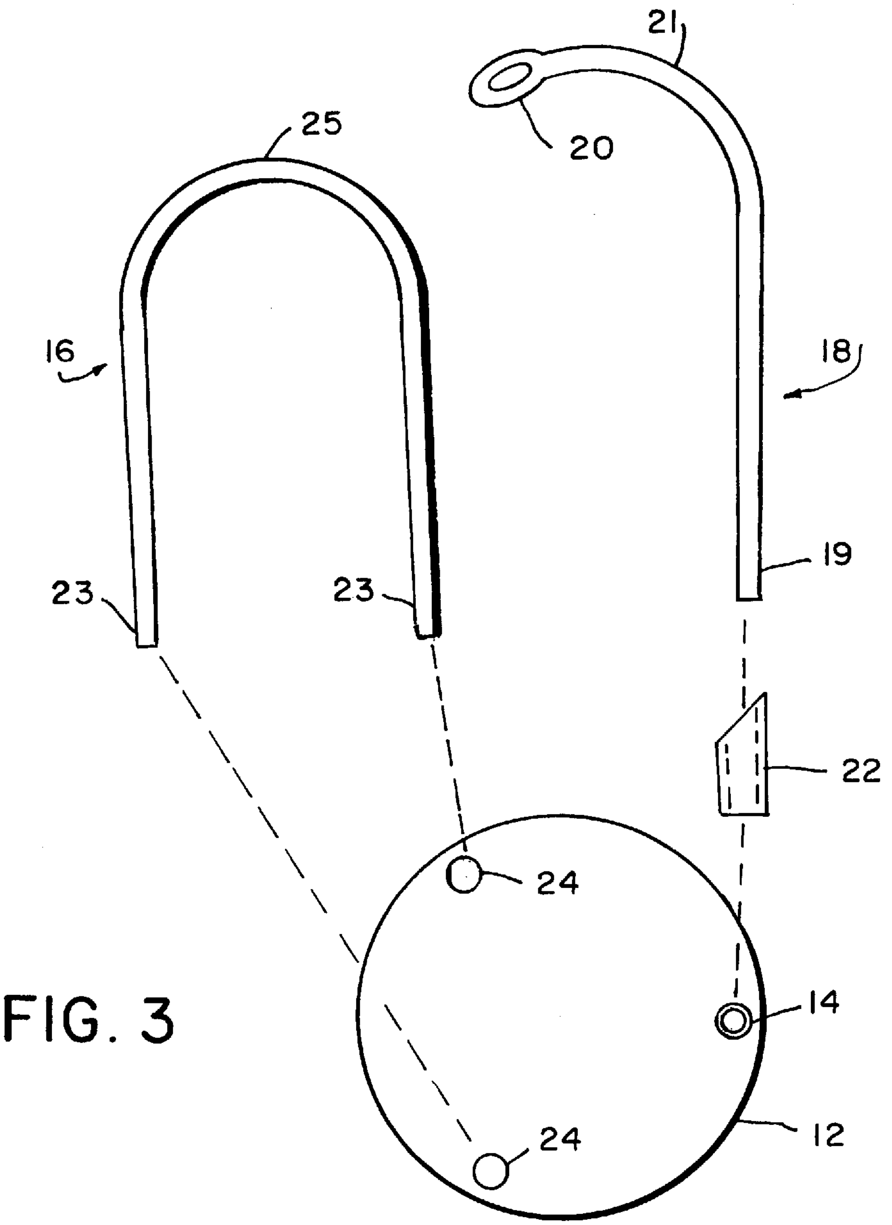
FIG. 3 is an exploded view of the propeller lock.

FIG. 3 shows the individual elements of the propeller lock. This figure shows how the different elements fit together. This figure gives a clearer view of the circle defined by the locking arm receiving hole 14 and the two attachment points 24. This circle must be larger than the end of the propeller shaft 52 to allow the U-shaped rod 16 and the locking arm 18 to align parallel to the propeller shaft 52. Parallel alignment with the propeller shaft 52 is preferable over the U-shaped rod 16 and the locking arm 18 flaring away from the propeller shaft 52.

The present invention provides a method for locking a cover plate to a propeller to restrict access to the propeller nut. The methods described for connecting the different elements are not meant to be inclusive. Therefore, various modifications can be made to the descriptions above while still falling within the scope of the general concept as defined by the claims.

While the invention has been described with reference to specific embodiments, modifications and variations of the invention may be constructed without departing from the scope of the invention, which is defined in the following claims.

I claim:

1. A propeller locking apparatus comprising a cover plate for positioning over an end of a propeller, a U-shaped rod, for encircling a first propeller blade, the U-shaped rod having two ends connected to the cover plate and a middle portion distant from the cover plate, a locking arm, for encircling a second propeller blade, the locking arm having a first end configured for connecting to the cover plate and a second end configured for connecting to the middle portion of the U-shaped rod.

2. The propeller locking apparatus of claim 1, wherein the cover plate is circular.

3. The propeller locking apparatus of claim 2, further comprising a locking arm receiving hole in the cover plate for receiving the first end of the locking arm.

4. The propeller locking apparatus of claim 3, wherein the first end of the locking arm is secured to the cover plate by insertion into the locking arm receiving hole.

5. The propeller locking apparatus of claim 4, further comprising a hollow locking arm receiving cylinder attached to the cover plate, wherein the cylinder is oriented concentrically with the locking arm receiving hole.

6. The propeller locking apparatus of claim 1, further comprising an eyelet on the second end of the locking arm for connecting to the middle portion of the U-shaped rod.

7. The propeller locking apparatus of claim 6, further comprising a lock receivable in the eyelet for connecting the eyelet to the middle portion of the U-shaped rod.

8. The propeller locking apparatus of claim 1, wherein the two ends of the U-shaped rod are connected to the cover plate spaced from a locking arm receiving hole.

9. The propeller locking apparatus of claim 8, wherein the two ends of the U-shaped rod are connected to the cover plate by welding.

10. The propeller locking apparatus of claim 1, wherein the middle portion of the U-shaped rod is curved.

11. A propeller locking apparatus comprising a cover plate for positioning over an end of a propeller, the cover plate having a locking arm receiving hole, a hollow locking arm receiving cylinder oriented concentrically with the locking arm receiving hole and attached to the cover plate, a U-shaped rod, for encircling a first propeller blade, the U-shaped rod having two ends connected to the cover plate and a middle portion distant from the cover plate, a locking arm for encircling a second propeller blade, the locking arm having a first end configured for inserting into the hollow locking arm receiving cylinder and the locking arm receiving hole, and a second end having an eyelet for connecting to the middle portion of the U-shaped rod, and a lock receivable in the eyelet for connecting the eyelet to the middle portion of the U-shaped rod.

12. The propeller locking apparatus of claim 11, wherein the cover plate is round.

13. The propeller locking apparatus of claim 11, wherein the two ends of the U-shaped rod are connected to the cover plate spaced from the locking arm receiving hole.

14. The propeller locking apparatus of claim 11, wherein the two ends of the U-shaped rod are connected to the cover plate by welding.

15. The propeller locking apparatus of claim 11, wherein the middle portion of the U-shaped rod is curved.

16. A method for locking a propeller comprising connecting two ends of a U-shaped rod to a cover plate, the U-shaped rod having a middle portion distant from the cover plate, placing the middle portion of the U-shaped rod around a first blade of the propeller, positioning the cover plate over an end of the propeller, connecting a first end of a locking arm to the cover plate, placing the locking arm around a second blade of the propeller, placing a second end of the locking arm in close proximity to the middle portion of the U-shaped rod, and connecting the second end of the locking arm to the middle portion of the U-shaped rod.

17. The method for locking a propeller in claim 16, further comprising inserting the first end of the locking arm into a hollow locking arm receiving cylinder connected to a locking arm receiving hole on the cover plate.

18. The method for locking a propeller in claim 17, further comprising providing an eyelet on the second end of the locking arm and connecting the eyelet to the middle portion of the U-shaped rod.

19. The method for locking a propeller in claim 18, further comprising providing a lock insertable in the eyelet and locking the eyelet and the middle portion of the U-shaped rod.

* * * * *